United States Patent [19]

Alavi

[11] Patent Number: 5,139,203

[45] Date of Patent: Aug. 18, 1992

[54] METHOD AND DEVICE FOR RECOVERY OF SCRAP GOODS

[76] Inventor: Kamal Alavi, St. Adrianstrasse 22a, CH-6318 Walchwil, Switzerland

[21] Appl. No.: 472,750

[22] Filed: Jan. 31, 1990

[30] Foreign Application Priority Data

Jun. 19, 1989 [CH] Switzerland ............... 02278/89

[51] Int. Cl.$^5$ ............................................. B02C 23/14
[52] U.S. Cl. ........................................ 241/20; 241/24; 241/29; 241/76; 241/77; 241/79.1; 241/80; 241/DIG. 38
[58] Field of Search ................. 241/24, 29, 80, 97, 241/79.1, 76, DIG. 38, 77, 78, 20

[56] References Cited

U.S. PATENT DOCUMENTS

| | | | |
|---|---|---|---|
| 2,942,792 | 6/1960 | Anderson et al. | 241/DIG. 38 X |
| 3,905,556 | 9/1975 | Drage | 241/DIG. 38 X |
| 4,044,956 | 8/1977 | Benedetto et al. | 241/DIG. 38 X |

FOREIGN PATENT DOCUMENTS

3347230  7/1985  Fed. Rep. of Germany .

OTHER PUBLICATIONS

Recycling of Metals, R. S. Kaplan and H. Ness, 1987.

Primary Examiner—Mark Rosenbaum
Assistant Examiner—Frances Chin

[57] ABSTRACT

Scrap goods (S), for example, electronic and electrical apparatus, components, cables and the like are intermittently and alternately mechanically crushed (1,3), magnetically separated (2) and mechanically-physically separated, for example, by means of electrostatic separators (5, 10–12). With the crushing, the dust produced is pneumatically gathered and filtered out (22,9). A non-metal fraction (A) as well as a magnetic (B) and non-magnetic fraction (C) are produced separately as granules and dust. The metal fractions (B, C) are suitable for further pyrolysis-free, wet chemistry and/or electrolytic separation. The non-metallic fraction is capable of being precipitated. The method is noted for its minimal energy consumption and high environmental compatibility.

29 Claims, 2 Drawing Sheets

METHOD AND DEVICE FOR RECOVERY OF SCRAP GOODS

The invention consists of a method and an installation for recovery of scrap goods, which contain metallic and non-metallic constituents. Such scrap goods, for example, fall in the category of defective or out-of-date electrical and electronic machines (computers, peripheral machines, electronic repair devices, electrical circuit and regulating apparatus), scientific apparatus, damaged components, damaged cables and wiring of all types, manufacturing by-products (for example copper plated circuit boards) and so forth. The composition of such types of scrap is exceptionally varied and heterogeneous, that is, the various materials occur in very irregular and very fine portions. In the metal constituents there are primarily iron, copper, aluminum, brass and solder and as well as various precious metals (gold, silver, platinum, palladium and so forth). The non-metal constituents are composed essentially of various types of plastics (partially fiber reinforced), ceramics, glass and so forth.

The annual yield of such most voluminous scrap goods is already very high (world-wide approximately 300,000 tons occurring yearly). It is obviously increasing rapidly in the face of technological development of electronics and information systems and the increased growth rate in the machine market, both of which lead to the rapid "generation change" of machines.

By itself the recovery of many such valuable and indispensable materials employed in manufacturing the machines would be tempting, in particular, modern electronic machines and their components which contain, for example, very considerable quantities of precious metals as contacts and conductive materials. Such recovery has clearly proven to be very difficult and until now could not be achieved in a satisfactory manner. Naturally manual processing or correspondingly sorting in the face of annual quantities would be totally unrealistic; at most, removal of functional units, for example from large housings or perhaps the separation of larger glass components (picture tubes from video tubes, monitors, etc.), can be given consideration.

Until now scrap goods recovery was tried mostly in a manner such that the scrap units were crushed for purposes of volume reduction and then were put in an oven. The combustible constituents were burned therein and the "ash" containing essentially metal oxides and strongly contaminated metal parts was then reduced by melting and, from that, refined pyrometallurgically in multiple steps. This process however, consumes considerable energy and is above all associated with the high output of dangerous air contamination. As a result of the high installation and operating costs (oven and melting devices, exhaust stacks, gas scrubbers and so forth) the economics of this type of process are placed in doubt, and because of the environmental burden remaining in spite of costly countermeasures, the processes are scarcely tolerable anymore.

In accordance with the method disclosed in DE-OS 33 47 230 televisions are reduced in two steps, and the mixture is separated by means of magnetic separation into magnetic and non-magnetic components whereby from the latter cardboard and paper particles were separated by wind sifting. The non-magnetic fraction is then guided into an emersion bath device, for example through a suspension of magnetite and water, and is separated into a light and heavy fraction; both fractions must eventually be dried and are then separated electrostatically, for example on the one hand into "wood, paper, cardboard" and "plastic", correspondingly on the other hand into "NE-metals" and "glass". With this method therefore various types of non-metals are yielded separately as well as NE-metals; the magnetic fraction together with the impurities, the components yielded by the wind sifting and in particular the powdered components are given no further consideration or further processing. Regarding the degree of separation (purity) of the fractions achieved and the degree of material recovery, the referenced publication contains no information. First of all however the emersion tank separation (flotation) employed is not advantageous. The operation of the installation with the continuous preparation of the separating fluid and in particular the subsequent drying of both fractions requires much energy and is the source of high operating costs; the minerals and chemicals required for charging the separating fluid are partially given up with the separated goods and again burden the subsequent processing.

It is an object of the present invention to achieve a re-use of recoverable materials contained in the scrap goods of the referenced type in an economic manner with minimum possible environmental damage and to render the remaining constituents—essentially non-metals—disposable. This object is achieved according to an inventive method which comprises succesively and alternately mechanically crushing and separating the scrap (S) in a closed system, the step of separating being performed by magnetic as well as mechanical-physical dry separation to produce a non-metallic fraction as well as magnetic and non-magnetic metal fractions separated in granular and powder forms, and then separating the two metal fractions in a pyrolysis-free, wet chemistry and/or electrolytic separation.

An installation according to the present invention for accomplishing the method is characterized in that the installation comprises at least a first and a second mechanical crushing machine and a magnetic separator arranged between them in relation to the material flow, and a first mechanical-physical separating machine for separation of the mixture segregated by the separator into a magnetic metal fraction and non-metallic fraction and at least a second mechanical physical separating machine is provided for separation of the mixture yielded by the magnetic separator and guided through the second crushing machine for separation into a non-magnetic metal fraction and a non-metallic fraction and further means are provided for recirculation of powder in one of the separating machines.

Useful variations of the foregoing method are given, and special embodiments of the installation according to the invention are given.

The present invention further relates to a magnetic metal fraction, a non-magnetic metal fraction as well as a non-metallic fraction obtained by the aforementioned method or correspondingly the aforementioned installation.

With the invention, the difficult and urgent problem of eliminating scrap goods is solved with a surprisingly efficient method in which a high recovery share of valuable ingredients is achieved with comparatively minimal energy expenditure and practically without any yield of environmentally damaging products or waste products.

In the following, the invention is explained further with the aid of an exemplary example with variations and the drawings in combination.

Figure 1:
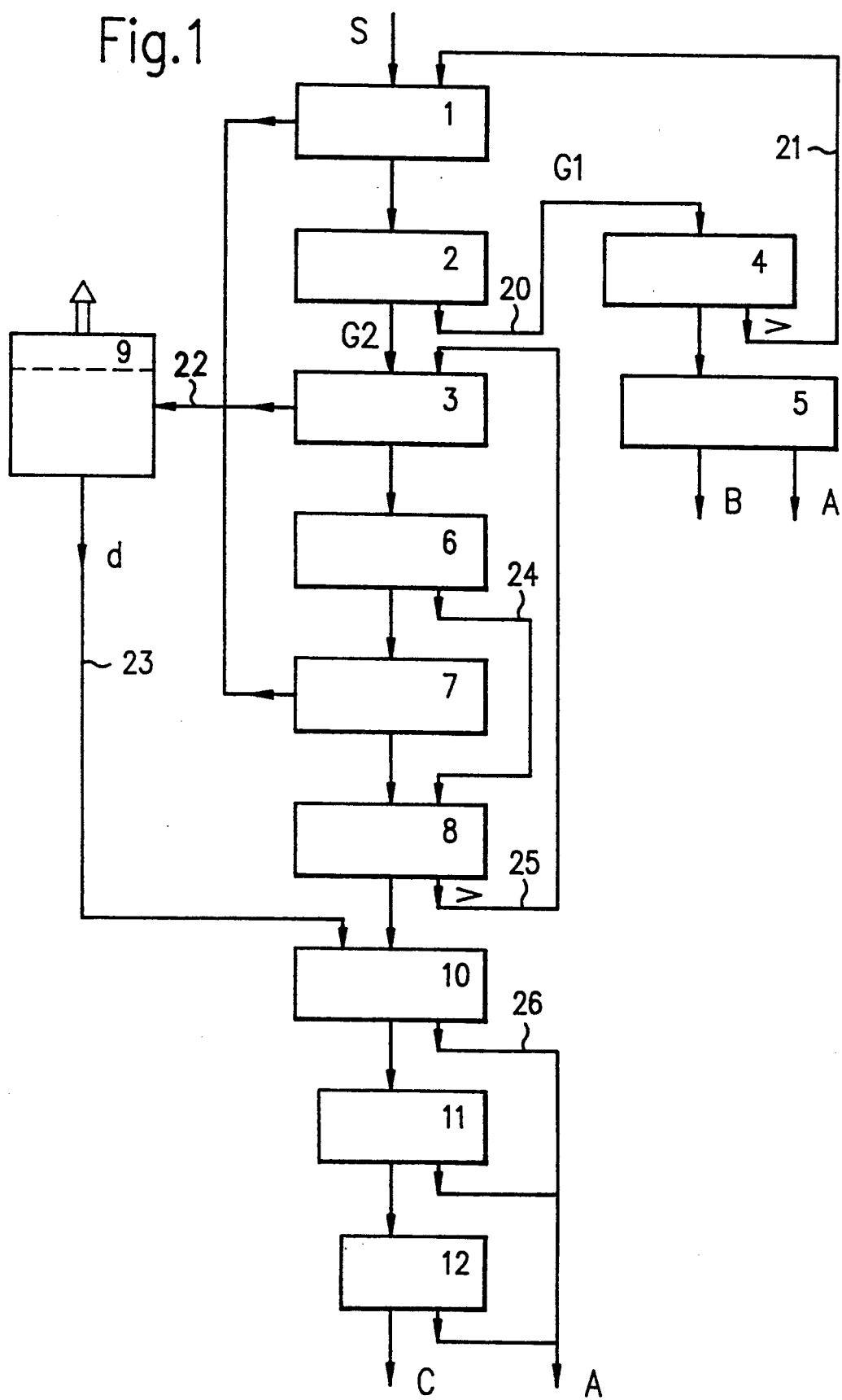
FIG. 1 shows schematically the flow chart of a method, or a corresponding layout of an installation for processing of scrap goods for the production of up to three fractions in granular and powder form.

According to the schematic illustration of FIG. 1 the scrap goods S are introduced into a first crushing machine 1, for example a hammermill, in which a coarse size reduction of the scrap is produced in fragments of a maximum of approximately 3 to 5 centimeters. These fragments are then transferred to a magnetic separator 2. With the magnetic separation, there is produced a segregation into a magnetic mixed fraction G1 and a non-magnetic mixed fraction G2. The mixed fraction G1 described as "magnetic", which is separated by the magnetic separator 2, contains metal particles with predominantly ferromagnetic constituents (metals and alloys of the iron group) which, however, are actually joined with other metals. Both mixed fractions G1 and G2 also carry with them a considerable amount of non-metallic parts.

At line 20 in FIG. 1, the magnetic mixed fraction G1 is introduced into a sieve 4, for example, a vibrating sieve with a mesh opening of approximately 2 cm) The sieve rejects (particle size of more than 2 cm) are circulated over the path 21 into the coarse crushing machine 1. The constituents of G1 passing through the sieve 4 are introduced accordingly into a mechanical-physical separating machine 5. In this a separation into the magnetic metal fraction B and a non-metallic fraction A is produced, which fractions are both yielded in a granular form with a certain powder constituent.

A further crushing step 3 follows the magnetic separator 2 for the non-magnetic mixed fraction G2, that is, the magnetic separator stands between the first crushing machine 1 and the second crushing machine 3 in relation to the material flow. In the latter, preferably a so-called shredder with rotating beating knives, a further crushing of the fraction G2 is produced with a maximum particle size of approximately 3 mm. These particles according to FIG. 1, are subsequently freed of dust in a dust separator device consisting of the units 6 and 7. For unit 6, an air separator is useful and for unit 7 a cyclone is employed. The particle mixture free of dust departing from the dust separating device 6, 7 is lead to a sieve device 8, for example, a vibrating sieve with a mesh of approximately 3 mm. In the dust separator device the air separator 6 mainly provides separation into heavy particles on the one hand and light particles with dust on the other hand. Only the light constituents are fed to the cyclone 7; otherwise, the heavy particles reach the sieve 8 directly via path 24, i.e. by-passing the cyclone. The rejects of the sieve 8 (particle size of 3 mm) are recirculated by way of path 25 into the preceding machine 3 for further crushing. The particle mixture passing through the vibrating sieve 8 accordingly reaches a second mechanical-physical separating machine 10.

As indicated in FIG. 1 with lines 22, it is appropriate with crushing—and insofar as sieving and dust removal are performed between the crushing machine 3 and the separating machine 10—to pneumatically collect the mixed dust and feed it to an air filter 9. The dust mixture d collected pneumatically in the air filter 9 is then also introduced into the separating device 10 (path 23). It is also mentioned that instead of the dust separating device consisting of an air separator 6 and cyclone 7 other devices should be considered depending, for example, upon the scrap processed, the crushing machine 3 employed or the type of mechanical-physical separating machine 10; for example, only a cyclone or only an air separator or another dust separating unit can be considered.

For mechanical-physical separation of the non-magnetic mixed fraction G2 (further reduced in size and freed of dust) a plurality of separating steps may be required, as indicated with the units 10, 11 and 12. In each step a decreased portion of the non-metallic fraction A is diverted (path 26) so that finally the non-magnetic metal fraction C is all that remains. Both fractions A, C appear again in a granular form with smaller or larger dust constituents. In a continuously operating device a plurality of separating machines 10, 11, 12 can be arranged in cascade for this purpose as illustrated in FIG. 1. It is however, possible to recirculate the metal particles respectively in batches through the same separating device and thereby progressively purify them. Moreover, it should be mentioned that more separation steps may be required also for separation of the magnetic mixed fraction G1.

For mechanical-physical separation of the two mixed fractions G1 and G2 (machines 5 or 10–12), electrostatically operated separating steps, that is, known electrostatic separators (sometimes also described as "electrodynamic" separators), are particularly suitable. With a plurality of units arranged in cascade, separators of the same type, or units having progressively smaller processing capacities, can be employed.

An installation according to FIG. 1 was constructed as a prototype for an hourly processing rate of 500 kg of scrap goods, predominantly circuit boards with mounted electronic components, (manufacturing) clippings of copper plated, glass fiber reinforced circuit boards and so forth. For this, a hammermill 1 with a power rating of 65 kW was used. The processing capacity of the other machines was selected according to the resulting quantitative distribution of the material flow. The entire power consumption of the installation (driving power of the individual machines) amounts to less than 100 kW. The electrostatic separators operate on a DC voltage of 24 kV with an AC reactive power of 45 kVA.

The following Table 1 gives an approximate breakdown of the material flow, which naturally depends largely on the processed scrap (percentage yield of the scrap quantity):

TABLE 1

| | | | S = |
|---|---|---|---|
| G1 | magnetic mixed fraction | 15% | |
| G2 | non-magnetic mixed fraction | 80% | 100% |
| d | filter dust | 5% | |
| A | non-metallic fraction | 72.6% | |
| B | magnetic metal fraction | 10% | 100% |
| C | non-magnetic metal fraction | 17.4% | |

After processing one ton of electronic scrap of the foregoing type the following constituents were found in the two metal fractions (percentage yield of the scrap quantity):

TABLE 2

| | |
|---|---|
| Fe | 5% |
| Ni | 2.2% |
| Sn + Pb | 2% |
| Al | 3% |
| Cu | 15% |
| Ag | 0.15% |
| Au | 0.06% |
| Pd | 0.02% |
| Non-metallic fraction | 72.57% (less than 0.1% metal constituents) |
| | 100% |

The two metal fractions the B and C are obtained according to the process and with the installation according to FIG. 1 by means of successive and alternating mechanical crushing and magnetic as well as mechanical-physical dry separating steps, and are produced in granular and powdered form. The machines employed in the installation are "incapsulated" as much as necessary, and the dust yielded is collected and fed back into the material stream. It is intended that no significant material component be discharged or lost to the environment but instead that practically the entire quantity of the processed scrap is contained in the fractions A, B and C. Also, for completely dry separations no foreign material is required which would have to be separated out again. With this, the system, or correspondingly the installation, is closed with regard to the material flow. Besides, it is established that even in the collected and recirculated dust not insubstantial components of the recovered precious metals are contained. The metal fractions B and C are intended and suitable for pyrolysis-free, wet chemical and/or electrolytic separation in further processing steps as further described below by examples with the aid of FIG. 2. With the process described above it is possible to recover the two metal fractions with a non-metallic constituent amounting to at most 0.1% by weight, and depending on the installation and the process steps, as well as (the type of scrap) it is possible to set the non-metallic constituent at less than 0.005% by weight.

The non-metallic fraction A is yielded likewise in granular form with a dust component. With the described process it is possible to reach the point at which the metallic constituent in the non-metallic fraction amounts to at most 0.1% by weight, preferably less than 0.005% by weight. By this and due to the strongly reduced volume, the non-metallic fraction can be readily disposed of in dump sites, that is, without environmental damage, yet it is also contemplated to reprocess this fraction.

The following Table 3 relates to the two metal fractions B and C alone. It shows as an example an established percentage distribution of the metals contained in the metal fraction, and further, the recovery factor q as achieved with the wet chemistry and electrolytic separation described below.

TABLE 3

| | % | q % |
|---|---|---|
| Fe | 18.0 | 99 |
| Ni | 7.979 | 99.5 |
| Sn + Pb | 7.144 | 98 |
| Al | 10.82 | 99 |
| Cu | 54.57 | 99.8 |
| Ag | 0.5405 | 99 |
| Au | 0.21473 | 98.5 |
| Pd | 0.07171 | 95 |

Figure 2:
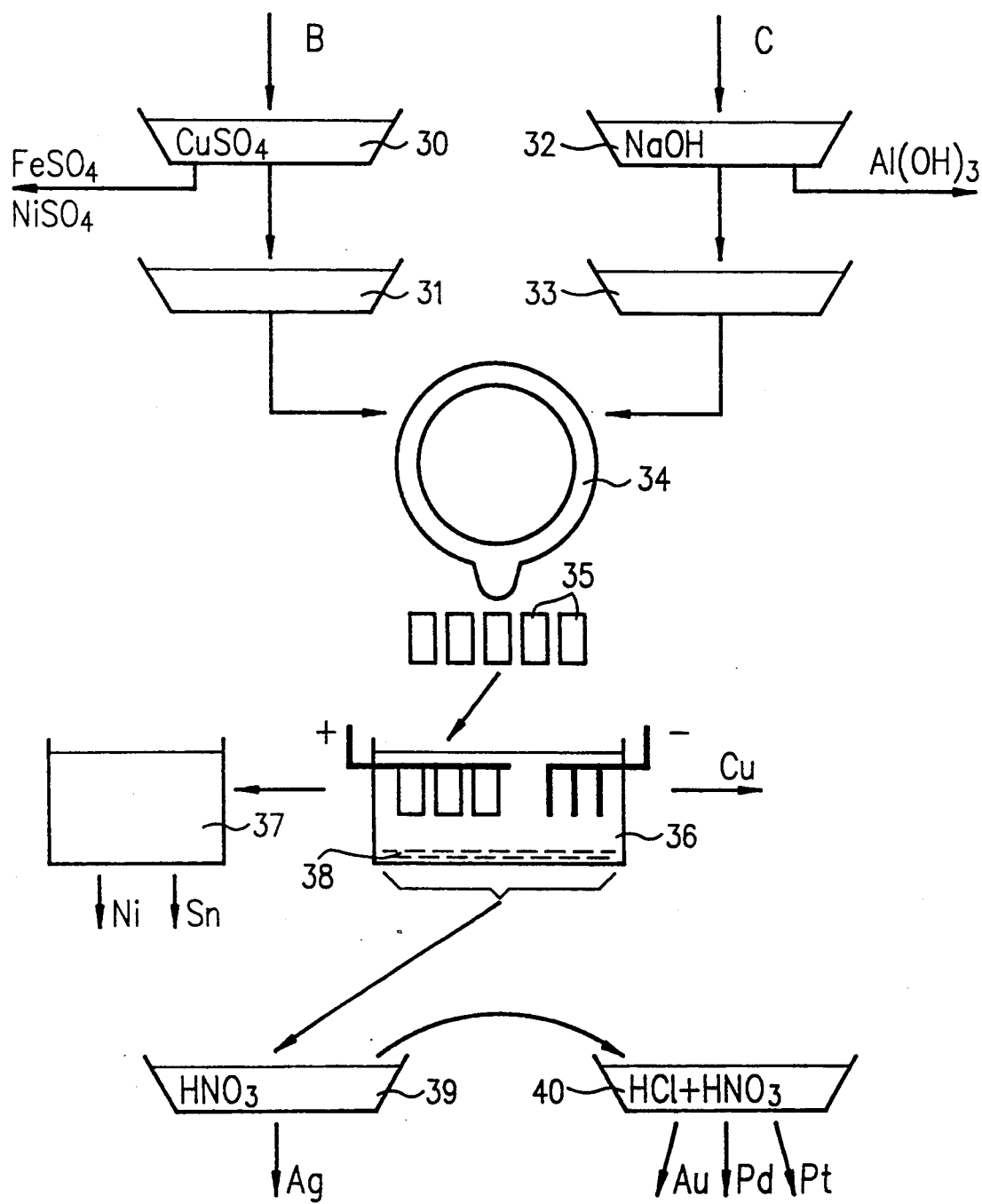
FIG. 2 is a schematic illustration of further wet chemical and electrolytic processing and separation of the metal fractions.

An example of the pyrolysis-free separation of the metal fractions B and C by means of wet chemical and electrolytic process steps is illustrated schematically in FIG. 2.

The magnetic metal fraction B with the main components Fe and Cu is released from the ferric compounds by means of a method described as "copper cementation". The fraction B is put in a tank 30 containing a copper sulfate solution $CuSO_4$ in which solution the exchange reaction $$CuSO_4 + Fe \rightarrow Cu + FeSO_4$$

takes place. In an analogous manner the fraction B is also released from the Ni-constituent corresponding to the exchange reaction $$CuSO_4 + Ni \rightarrow Cu + NiSO_4$$

The iron sulfate $FeSO_4$ formed by the ion exchange can be further employed and is in particular needed in larger quantities for the purification of waste water.

The non-magnetic metal fraction C, which in general contains a larger portion of aluminum, is put in a tank 32 containing a caustic soda solution. The aluminum portion is extracted according to the formula $$2NaOH + 2H_2O \rightarrow 2NaAlO_2 + 3H_2O.$$

In the caustic soda solution, the sodium aluminum oxide dissociates into sodium hydroxide NaOH and aluminum hydroxide $Al(OH)_3$, which precipitates out. The latter can in particular be re-employed in the production of ceramics.

The leftover constituents of the fractions B and C (predominantly Cu), released from the ferric metal and aluminum respectively as described, are passed through a wash bath (tanks 31 or 33); they can then be melted down at 1300° C. (crucible 34) and poured into anodes 35. This involves a simple melting process without metallurgical reactions.

In a galvanic bath 36 the copper is then separated electrolytically from the anodes 35. Remaining Ni— and Sn— constituents can likewise be separated electrolytically in a further bath 37. The sediment 38 (sludge) formed in the bath 36 and likewise in the bath 37 contains essentially the precious metal constituents recovered from the scrap goods and found in the metal fractions B and C.

The precious metals can be concentrated, separated and refined by known methods including wet chemistry and electrolysis: In a tank 39 with nitric acid $HNO_3$, the silver is first precipitated. A further tank 40 with hydrochloric acid HCL and nitric acid $HNO_3$ serves to precipitate gold, palladium and platinum. The previous metals precipitated and enriched in this way will again be separated electrolytically for the purpose of final refining.

As shown in the foregoing description with the aid of FIG. 2, the separation of the metal fractions B and C is produced without pyrolytic reactions and the associated environmental damage. This is primarily possible thanks to the high product separation (purity) with which the metal fractions are obtained from the preceding separating process according to the example of FIG. 1.

We claim:

1. A method for recovery of scrap goods containing non-metallic and metallic constituents comprising
   (a) subjecting the scrap (S) to at least one mechanical crushing operation in a closed system, and
   (b) subjecting the crushed scrap to at least one dry separation procedure in a closed system wherein no additional processing materials are added to the scrap, and wherein the separation procedure is performed by magnetic as well as electrostatic separation to produce a non-metallic fraction (A), a magnetic metal fraction (B) and a non-magnetic metal fraction (C) in granular and powder forms, the metal fractions (B, C) being suitable for further processing by at least one of the pyrolysis-free separation procedures selected from the group consisting of wet chemical separation and electrolytic separation.

2. A method for recovery of scrap goods as defined in claim 1 further including the step of:
   further processing the two metal fractions (B, C) by subjecting the fractions to a wet chemical separation procedure.

3. A method for recovery of scrap goods as defined in claim 1 further including the step of:
   further processing the two metal fractions (B, C) by subjecting the fractions to an electrolytic separation procedure.

4. A method for recovery of scrap goods as defined in claim 1 wherein the steps (a) and (b) are repeated successively.

5. A method for recovery of scrap goods containing non-metallic and metallic constituents comprising
   (a) subjecting the scrap (S) to at least one mechanical crushing operation in a closed system;
   (b) subjecting the crushed scrap to at least one dry separation procedure in a closed system wherein no additional processing materials are added to the scrap and wherein the separation procedure is performed by magnetic as well as electrostatic separation to produce a non-metallic fraction (A), a magnetic metal fraction (B) and non-magnetic metal fraction (C) in granular and powder forms, and
   (c) further processing the two metal fractions (B, C) by subjecting the fractions to at least one of the pyrolysis-free separation procedures selected from the group consisting of wet chemical separation and electrolytic separation.

6. A method for recovery of scrap goods as defined in claim 5 wherein the steps (a) and (b) are repeated successively.

7. A method according to claim 6 wherein the steps of alternately crushing and separating include coarse crushing the scrap and then magnetically separating the scrap mixture into mixed magnetic and non-magnetic fractions (G1, G2) and then electrostatically separating the mixed fractions.

8. A method according to claim 7 wherein the non-magnetic mixed fraction (G2) obtained by magnetic separation is further crushed before the electrostatic separation.

9. A method according to claim 8 wherein the mixed fraction which is further crushed is freed of dust before the element electrostatic separation.

10. A method according to claim 9 wherein the non-magnetic mixed fraction G2, subsequent to the steps of further crushing and freeing of dust, is passed through a sieve and the sieve contents are recirculated in the step of further crushing before the electrostatic separation.

11. A method according to claim 9 wherein the powder mixture resulting from the crushing and likewise the freeing of dust is pneumatically gathered, filtered and separated electrostatically together with the non-magnetic mixed fraction.

12. A method according to claim 7 wherein the magnetic mixed fraction (G1) is passed through a sieve and the rejected contents of the sieve are recirculated through the coarse crushing step.

13. A method according to claim 5 including the added steps of extracting a ferric constituent from the magnetic metal fraction (B) by means of copper cementation (30), and an aluminum constituent from the non-magnetic fraction (C) by means of a caustic process, and the remaining constituents of the two metal fractions (B, C) are further processed to form anodes.

14. A method according to claim 13 wherein the remaining constituents include copper and precious constituents, the copper constituent is electrolytically separated from the anode (35) and the precious metal constituent is purified from the residue of an electrolytic bath by at least one purification procedure selected from the group consisting of wet chemistry and electrolysis.

15. A magnetic metal fraction (B) recovered by the process of claim 5.

16. A metal fraction according to claim 15 characterized in that its non-metallic constituent amounts to at most 0.1% by weight.

17. A non-magnetic metal fraction (C) recovered by the process of claim 5.

18. A metal fraction according to claim 17 characterized in that its non-metallic constituent amounts to at most 0.1% by weight.

19. A non-metallic fraction (A) recovered by the process of claim 5.

20. A non-metallic fraction according to claim 19 characterized in that its metal constituent amounts to at most 0.1% by weight, preferably less than 0.005% by weight.

21. An installation for the recovery of scrap goods containing non-metallic and metallic constituents comprising at least a first and a second mechanical crushing machine (1, 3) and a magnetic separator (2) arranged between them in relation to the material flow, a first electrostatically operated separator (5) for separation of the mixture segregated by the magnetic separator (2) into a magnetic metal fraction and a non-metal fraction, and at least a second electrostatically operated separator (10-12) for separation of the mixture (G2) yielded by the magnetic separator (2) and guided through the second crushing machine (3) for separation into a non-magnetic metal fraction and a non-metallic fraction and further means (22, 9, 23) for recirculating powder from a crushing machine to one of the separating machines.

22. The device according to claim 21 characterized in that a sieve device (4) precedes the first electrostatically operated separator (5).

23. A device according to claim 21 characterized in that a sieve device (8) precedes at least a second electrostatically operated separator (10, 12).

24. A device according to claim 23 wherein in between the second crushing machine (3) and the sieve device (8) a dust separating device (6, 7) is provided.

25. A device according to claim 24 wherein the dust separating device contains a cyclone (7).

26. A device according to claim 24 wherein the dust separating device contains a swirl sorter (6) and a cyclone (7).

27. A device according to claim 24 wherein the dust separating device contains a swirl sorter (6).

28. A device according to claim 24 wherein the crushing machines (1, 3) and likewise the dust separating device (6, 7) are connected to a pneumatically operated dust collector (9).

29. A device according to claim 21 wherein at least a plurality of electrolytically operated separators (10-12) are arranged in cascade for separation of the mixture (G2) into non-magnetic metal fractions and non-metallic fractions.

* * * * *